(12) United States Patent
Levin et al.

(10) Patent No.: US 6,443,509 B1
(45) Date of Patent: Sep. 3, 2002

(54) TACTILE SENSOR

(75) Inventors: Shalom Levin, Atlit; Shai Abramson, Pardesia, both of (IL)

(73) Assignee: Friendly Robotics Ltd., Kadima (IL)

( * ) Notice: Subject to any disclaimer, the term of this patent is extended or adjusted under 35 U.S.C. 154(b) by 0 days.

(21) Appl. No.: 09/531,393

(22) Filed: Mar. 21, 2000

(51) Int. Cl.$^7$ .............................................. B61F 19/00
(52) U.S. Cl. .............................. 293/4; 293/2; 293/102; 293/120; 200/61.43
(58) Field of Search ................................ 180/274, 275, 180/277, 279; 340/436; 200/5 A, 61.43; 293/2, 4, 102, 117, 120

(56) References Cited

U.S. PATENT DOCUMENTS

| | | | |
|---|---|---|---|
| 3,560,922 A | 2/1971 | Wilson | 340/61 |
| 4,126,344 A | 11/1978 | Vaill | 293/4 |
| 4,596,412 A * | 6/1986 | Everett et al. | 293/4 |
| 4,683,974 A | 8/1987 | Richardson | 180/274 |
| 4,730,690 A * | 3/1988 | McNutt et al. | 180/274 |
| 4,802,548 A * | 2/1989 | Karusch | 180/274 |
| 4,951,985 A * | 8/1990 | Pong et al. | 293/102 |
| 4,967,862 A * | 11/1990 | Pong et al. | 180/297 X |
| 4,977,388 A | 12/1990 | Park | 340/436 |
| 5,163,273 A | 11/1992 | Wojtkowski et al. | 56/11.9 |
| 5,465,807 A * | 11/1995 | Josephs | 180/274 |
| 5,703,450 A | 12/1997 | Josephs | 318/379 |
| 5,793,005 A | 8/1998 | Kato | 200/61.45 R |

FOREIGN PATENT DOCUMENTS

WO  WO 99/59042  11/1899

OTHER PUBLICATIONS

U.S. patent application Ser. No. 29/120,576, filed Mar. 21, 2000, Robotic Lawnmower.
U.S. patent application Ser. No. 09/531,735, filed Mar. 21, 2000, Lawnmower Cutting Deck and Improved Blade Assembly.
U.S. patent application Ser. No. 09/221,834, filed Dec. 29, 1998, Method for Operating a Robot.
"Robomow—Installation and Operation Guide" ©1999—16 Pages.
"Robomow—The World's First Moving Robot"—8 Pages.
"Robomow—Enjoy Your Free Time"—4 Pages.
"Robomow—User Guide"—15 Pages.

* cited by examiner

Primary Examiner—Joseph D. Pape
Assistant Examiner—Lori L Coletta
(74) Attorney, Agent, or Firm—Holland & Knight LLP

(57) ABSTRACT

There is provided a tactile sensor that is a status sensor that move between inactive and active states. The tactile sensor can cover a large area and can be in the form of long strips. Its construction allows it to cover surfaces that are flat or curved or that include bends. In an exemplary application, these tactile sensors may be used as vehicle bumpers or in other applications where contact with an object, surface or the like needs to be detected. Activation of the sensor, typically coupled to a control system that controls motion of the vehicle, may cause the vehicle to shut off, typically ceasing motion, within a predetermined distance.

12 Claims, 6 Drawing Sheets

US 6,443,509 B1

TACTILE SENSOR

CROSS REFERENCES TO RELATED APPLICATIONS

This patent application is related to commonly owned U.S. Design Patent Application entitled: ROBOTIC LAWNMOWER, filed on even date herewith, and commonly owned U.S. Utility Patent Application entitled: LAWNMOWER CUTTING DECK AND IMPROVED BLADE ASSEMBLY, also filed on even date herewith, both of these patent applications are incorporated by reference herein.

FIELD OF THE INVENTION

The present invention is related tactile sensors, and in particular to long tactile sensors that are strip-like in form, cover flat, curved and bent surfaces, and are economical in their manufacture and implementation on devices, for example as bumpers on vehicles.

BACKGROUND OF THE INVENTION

Various tactile sensors in vehicle bumpers are in use today. For example, transient sensors, such as pressure sensors in vehicle bumpers function on impact when the speed of the impact is sufficient to activate these sensors. As a result, there my be a significant impact at the bumper, but if at a the impact is at a slow speed, the sensor will not activate. This may result in significant damage to property or worse, injury and fatality to humans and animals.

SUMMARY OF THE INVENTION

The present invention improves on the contemporary art by providing a tactile sensor that is a status sensor that moves between inactive and active states. The tactile sensor can cover a large area and can be in the form of long strips. Its construction allows it to cover surfaces that are flat or curved or that include bends. The tactile sensor can be manufactured economically from inexpensive materials. These tactile sensors may be used for example, as vehicle bumpers or in other applications where contact with an object, surface or the like needs to be detected. Activation of the sensor, typically coupled to a control system that controls motion of the vehicle, may cause the vehicle to shut off, typically ceasing its motion, within a predetermined distance or stopping distance. For example, this distance or stopping distance may be approximately the distance the bumper protrudes from the vehicle, and preferably is not greater than the distance the bumper protrudes from the vehicle, so as to reduce risks of injury and damage.

One embodiment of the present invention is directed to a tactile sensor comprising a profile member configured to be self supporting and collapsible upon impact. This profile member includes a main portion, a protrusion having a first end and a second end, with the first end in communication with the main portion, and an electrically conductive portion at the second end of the protrusion. The electrically conductive portion is adapted for electrical contact with an electrically conductive member, when the profile member has collapsed. This electrically conductive member may be either separate from the sensor or attached thereto by its placement on a support member, this support member adapted for attachment to the profile member.

Another embodiment of the present invention is directed to a movement control system for the drive system of a vehicle, for example, a robotic lawnmower. This movement control system is such that a bumper, extending (protruding) from the vehicle body, a distance D, will absorb the shock of an impact with an object or the like, within this distance D and the control elements will stop the vehicle drive system, whereby the vehicle typically travels no further than this distance D.

The vehicle includes a body, and the movement control system comprises, a bumper including a profile member configured for coupling to the vehicle body. The profile member extends (protrudes) distance D from the body, and is configured to be self supporting and collapsible upon impact with an object or the like. The profile member comprises, a main portion, a protrusion having a first end and a second end, the first end in communication with the main portion, and an electrically conductive portion at the second end of the protrusion. There is also an electrically conductive member in communication with the body, the electrically conductive portion and the electrically conductive member arranged to create an electrical contact when the profile member has collapsed to at least a predetermined distance from an impact with an object. There is also a controller electrically (electronically) coupled with the electrically conductive portion and the electrically conductive member, this controller configured to deactivate the drive system of the vehicle upon said electrical contact of the electrically conductive portion, stopping the vehicle before the vehicle has moved a distance of approximately D, and preferably a distance of D or less, after the initial contact with the object upon impact therewith.

BRIEF DESCRIPTION OF THE DRAWINGS

Attention is now directed to the attached drawings, wherein like reference numeral or characters indicate corresponding or like components. In the drawings.

DETAILED DESCRIPTION OF THE DRAWINGS

Figure 1:
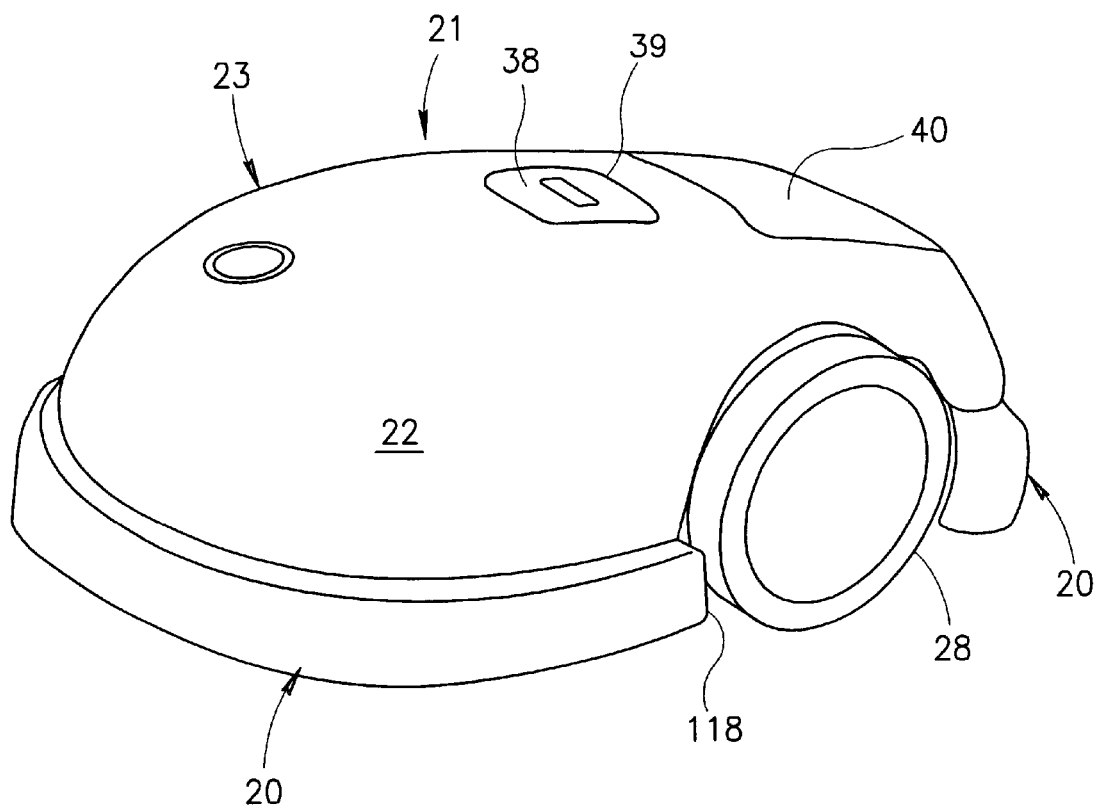
FIG. 1 is a perspective view of an autonomous robot employing a first embodiment of the present invention in an exemplary use as a bumper.
Figure 2:
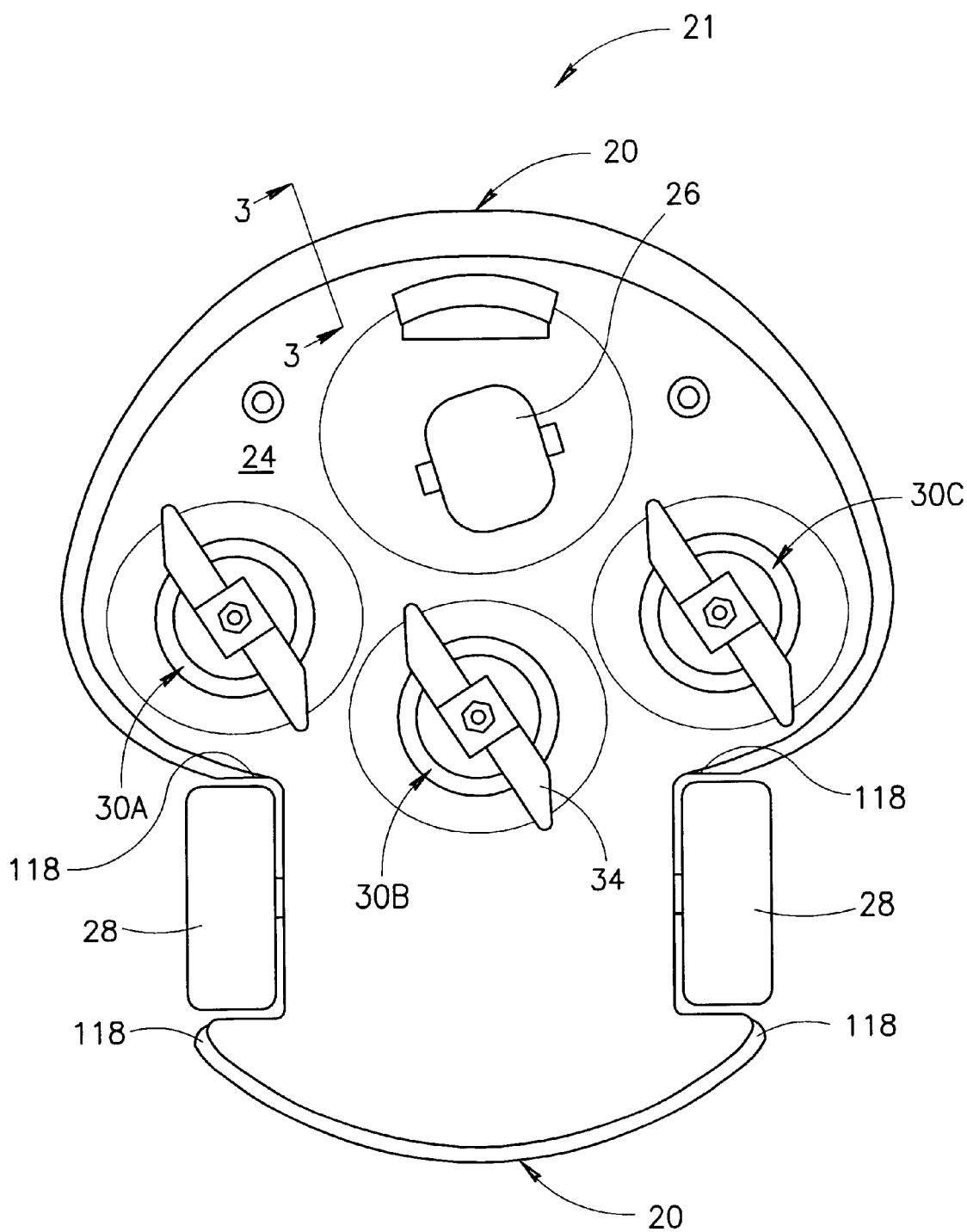
FIG. 2 is a bottom view of the autonomous robot of FIG. 1 as employing the present invention.

FIGS. 1 and 2 detail the tactile sensor 20 of the present invention in an exemplary use as bumpers on a vehicle, such as an autonomous robot 21. Here, for example, the autonomous robot is configured as a lawn mower, such as that detailed in commonly owned U.S. Patent Application, entitled: LAWNMOWER CUTTING DECK AND IMPROVED BLADE ASSEMBLY, filed on even date herewith, and incorporated by reference herein. Construction and operational components of this robotic lawnmower are detailed in the above-listed U.S. Patent Application, and some construction and operational details are repeated below to illustrate the present invention in exemplary uses and operations.

The robot 21 is constructed with that detailed in commonly owned U.S. Patent Application entitled: LAWN- MOWER CUTTING DECK AND IMPROVED BLADE ASSEMBLY, filed on even date herewith (above). It has a body 22 with an outer shell 23 and a cutting deck 24, typically a mulching deck, along with front 26 and rear 28 wheels. The body 22 and cutting deck 24 accommodate and retain blade assemblies 30a–30c, each having a motor (32a–32c shown in FIG. 5) and blades 34, in an arrangement that defines a cutting system of the present invention. The body 22 and outer shell 23 also Include a slot 38 for a controller 39, both remote and manual, as detailed in commonly owned U.S. patent application Ser. No. 09/221,834, entitled: METHOD FOR OPERATING A ROBOT, incorporated by reference herein, as well as that found on the ROBOMOW® Classic™ lawnmower, as described in "Robomow Installation & Operation Guide", ©1999, also incorporated by reference herein, and for controlling features such as, ON(GO)/OFF(STOP), robot movement, cutting patterns and blade cutting speeds, and a space 40 for a power supply 41 (FIG. 5) such as a batteries (for example, two standard 12V batteries).

Figure 3:
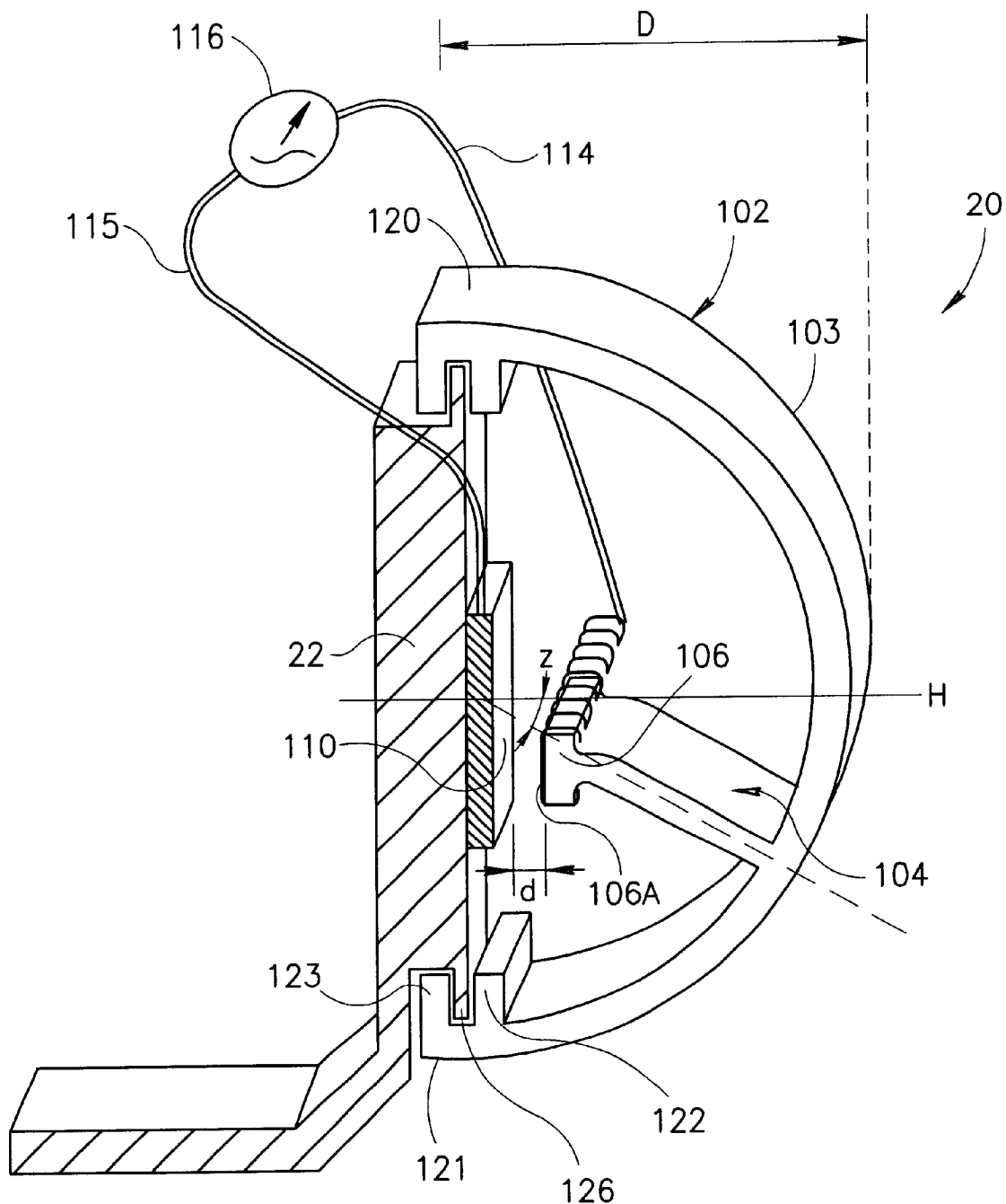
FIG. 3 is a cross-section of the present invention taken along line 3—3 of FIG. 2.
Figure 4:
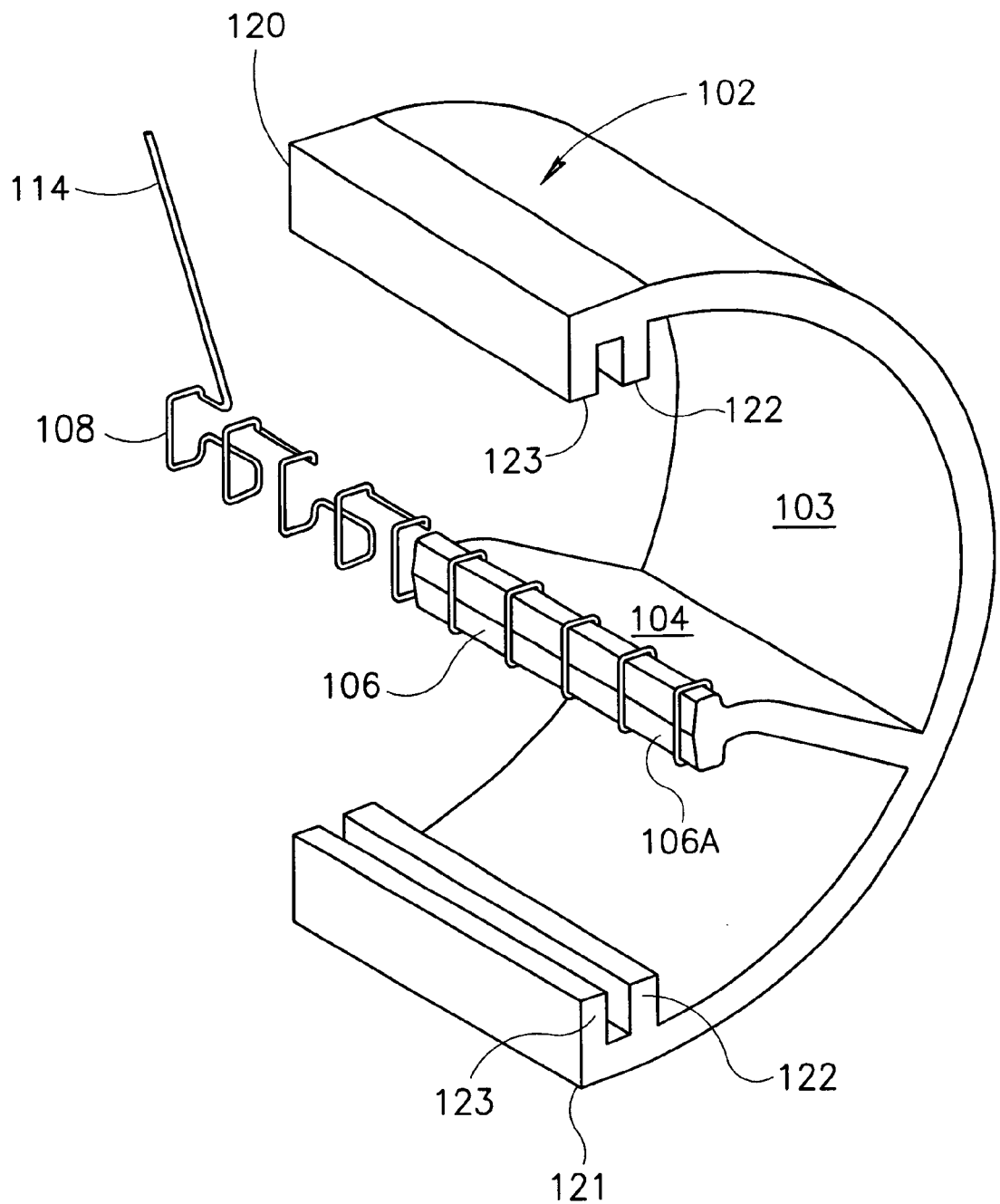
FIG. 4 is a cross-section of a portion of the present invention as shown in FIG. 2.

Turning also to FIG. 3, the tactile sensor 20 is shown in an inactive state, prior to its being activated. The tactile sensor 20 includes a profile member 102, formed of a main segment 103 and a protrusion 104 terminating in a rib 106, that supports an electrically conducting coil 108. The protrusion 104 and rib 106, run at least substantially the entire length of the profile member 102. The profile member 102 attaches to the body 22, here the outer shell 23 of the vehicle 21, in a manner to form an air space 109 therebetween. An electrically conductive strip 110 extends along the portion of the outer shell 23 covered by the profile member 102, and is placed on the outer shell 23, to be in alignment with the coil 108, to allow for an electrical contact when the bumper 20 contacts an object. The coil 108 and electrically conductive strip 110 both have electrical leads 114, 115, extending therefrom, that terminate in a switch 116 or the like, that closes when the coil 108 and strip 110 are in electrical contact. The switch 116 typically connects to an operating (main control) unit 150 (FIG. 5), for control of the robot 21.

The lateral ends 118 (FIGS. 1 and 2) of the profile member 102, typically lack the protrusion 104 and are configured to fold over the remainder of the profile member 102 and attach to the body 22 like the remainder of the profile member 102, as detailed below. This configuration caps the lateral ends 118 of the tactile sensor 20 and maintains the Integrity of the air space 109, free of moisture, debris, etc. Alternately, separate end members at the lateral ends 118 of the profile member 102 are also permissible, provided they cap the lateral ends 118 and maintain the integrity of the air space 109 of the profile member 102.

The profile member 102, and specifically the main segment 103, is in a geometry, typically rounded or other configuration, that is self supporting when the sensor 20 is in a rest or inactive state, and is collapsible upon impact with an object. Additionally, this profile member 102 is configured to absorb the shock associated with the impact, over its protrusion (outward extension) distance D.

The main segment 103 typically includes ends 120, 121 formed by oppositely disposed pairs of flanges 122, 123. These flanges 122, 123 are spaced apart a distance that is typically equal to or less than the width of a flange member 126 on the body 22, so as to attach the profile member to the body 22 by a friction fit. This friction fit may be supplemented with adhesives or other mechanical fasteners, or other mechanical fastening systems may be used instead of the flanges, with the body 22 modified accordingly if necessary to provide corresponding structure for supporting the mechanical fastening arrangement.

The protrusion 104 extends from the main segment 103, typically at an angle "z" of greater than 0 degrees and less than 90 degrees with respect to the horizontal H, and terminates in a rib 106. This angle "z" is typically approximately 30 degrees with respect to the horizontal H, but any angle within the above detailed range is sufficient so long as the angling permits minimal resistance for the collapse of the profile member 102 upon impact. Moreover, the angling allows for a wiping action upon collapse of the profile member 102 (main segment 103) as the rib 106 with the coil 108 slides along the strip 110, allowing a longer electrical contact and creating a cleaning effect, to remove oxidation, dust, etc, from the strip 110.

The rib 106 has a leading edge 106a, at a distance d from the strip 110. This distance d can be determined as desired by the designer, In accordance with the force desired to be detected (the resilience of the material selected and the configuration of the main segment 103 also being taken into account during this designing, as detailed below).

The rib 106 is typically T-shaped so as to accommodate the coil 108 in a frictionally tight engagement, while allowing for coil 108 coverage over a large portion of the outer area or surfaces of the rib 106. This increases the chance as well as the time length of an electrical contact with the strip 110 should the main segment 103 that forms the leading portion of the bumper, be contacted from any angle (direction) and collapse from impact.

The profile member 102 is typically a one piece, unitary member of a material such as thermoplastic rubber at a hardness, for example, a Shore hardness of approximately 55. Suitable thermoplastic rubbers/elastomers for example, include SANTOPRENE® (Monsanto Corporation, St. Louis, Miss.) and FORPRENE® (SO.F.TER. S.P.A. 47100 Forli Of, Italy). This unitary profile member is formed by techniques such as injection molding. The profile member 102 could also be made from multiple pieces, by other conventional techniques.

The materials selected for the profile member 102 should have a resiliency that allows for elastic deformations, allowing the tactile sensor 20 to move between inactive and active states (back and forth). As stated above, the profile member 102 is typically in a partially cylindrical configuration, typically rounded in shape, that results in a self-supporting structure, that coupled with the resilience of the material, is shock absorbing and can provide some resistance to some small forces, but will allow for the a profile member 102 to collapse and deform (elastically), and make the above described electrical contact, when a contact with a sufficient force has been made. Other profile member main segment shapes are also permissible, provided they result in self-supporting configurations yet allow for collapse and elastic deformation of the member when the requisite contact between the bumper and an object is made.

The coil 108 is made of an electrically conducting material, such as metals including stainless steel, that exhibits some spring like behavior, to allow the above described frictional engagement of the rib 106. The coil 108 is typically a spring, slid onto the rib 106 then pulled to tighten it and form a frictional engagement with the rib 106 by clamping thereto. The coil 108 can be replaced by a C-shaped electrically conductive member, preferably with some resiliency, to frictionally engage the rib 106, this engagement may be enhanced with adhesives or other mechanical fasteners. Otherwise, the C-shaped member or can be attached thereon by adhesives, mechanical fasteners, or both. Additionally, the rib 106 can be covered with electrically conductive strips, attached to the rib 106 by conventional techniques, such as adhesives, on as many surfaces as desired. Also, the rib 106 can be coated with electrically conductive metal, such as Nickel or chrome, or material, such as rubber or other polymeric material with electrically conductive particles, for example, EPDM rubber impregnated with aluminum particles, on as many surfaces as desired, by conventional coating techniques.

The strip 110 that attaches to the body 22, by adhesives or other conventional fasteners is of an electrically conducting material, and typically an electrically conducting metal such as stainless steel. Alternately, the strip 110 may be formed by an electrically conductive metal coating, of a metal such as nickel or chrome or of a material such as rubber or other polymeric material with electrically conductive particles, for example, EPDM rubber impregnated with aluminum particles, placed onto the body 22 by conventional coating techniques.

Figure 5:
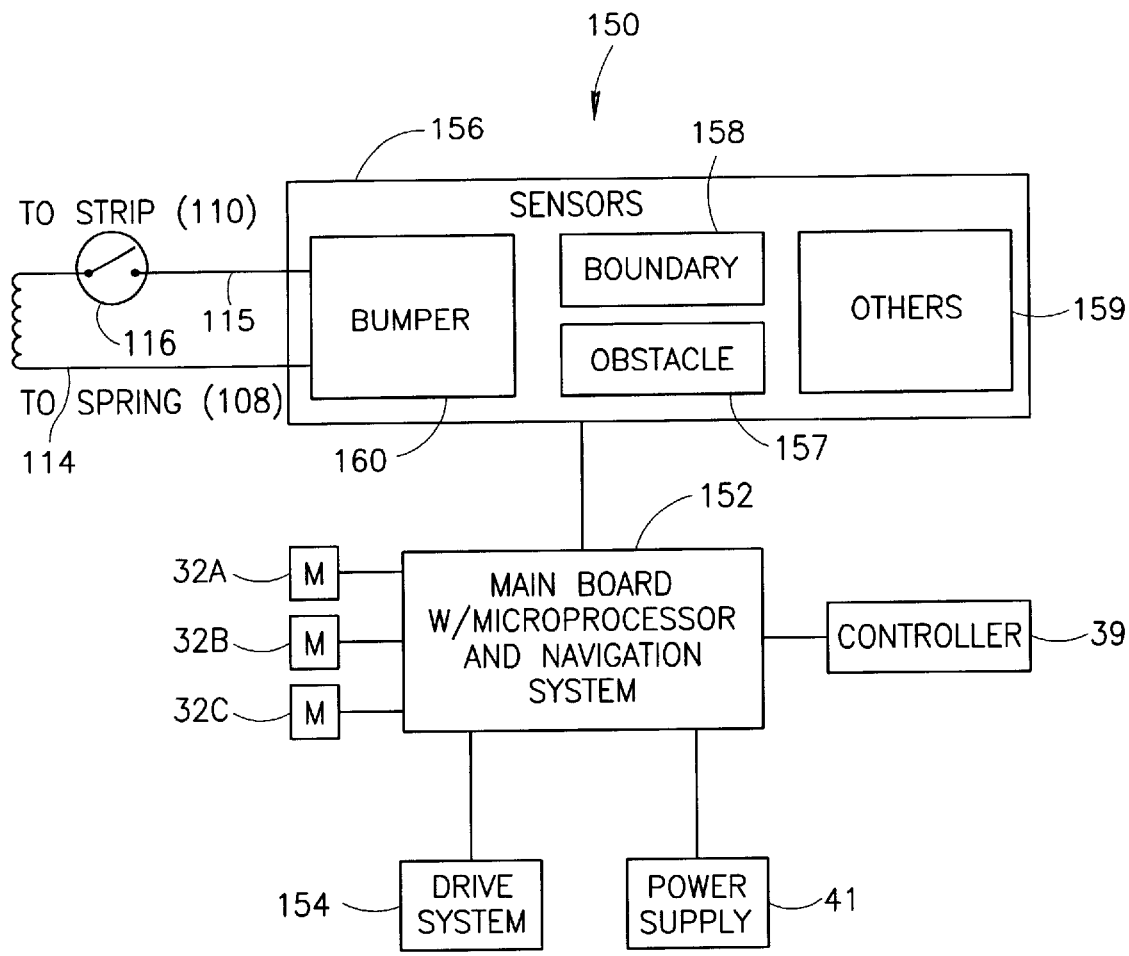
FIG. 5 is a schematic diagram of the operating system of the autonomous robot employing including components of the present invention.

FIG. 5 details the operating system 150 for the robot 20 housed in the body 22. While main components of the system are detailed here, all other components are identical or similar to those detailed in the ROBOMOW® Classic™ lawnmower, commonly owned PCT Applicaton No. PCT/IL99100248 (WO 99/59042) entitled: AREA COVERAGE WITH AN AUTONOMOUS ROBOT, this PCT Application also incorporated by reference herein, and in the commonly owned U.S. Patent Application entitled: LAWNMOWER CUTTING DECK AND IMPROVED BLADE ASSEMBLY, filed on even date herewith.

The operating system 150 or main control system includes a main board 152 with a microprocessor. The main board 152 also Includes components for providing a mapping and navigation system, such as that detailed in PCT/IL99/00248. The main board 152 provides logic (circuitry) for the drive system 154 that controls movement of the wheels 26, 28. It also provides logic for sensors in the sensor unit 156, for example, sensors associated with detecting obstacles 157, boundaries 158 and other conditions 159, as detailed in PCT/IL99100248, as well as a bumper sensor 160. The main board 152 is also coupled to each of the motors 32a–32c, as well as the controller 39, whose operation is detailed above. All components of this operating system are powered by the power supply 41.

This bumper sensor 160 connects to the electrical leads 114, 115, from the spring 108 and strip 110, respectively. When the electrical contact between spring 108 and the strip 110 is made, as detailed above, at any point along the bumper, the switch 116 closes and the bumper sensor 160, typically an input to the microprocessor on the main board 152, signals the microprocessor that signals the drive system circuitry 154 to switch the robot 21 to OFF, typically by shutting off the power from the power supply 41. In one embodiment, the profile member 102 may be configured in coordination with the operating system 150, such that the robot 21 will cease motion within the time the profile member 102 is collapsing and absorbing the shock of the Impact from the object, over distances not greater than the distance D (FIG. 3).

The operating system 150 can be configured, that once turned OFF, the robot may only be turned ON by the operator activating an ON or other similar command, via the controller, whereby the robot would resume operation. Other programming of the main board 152 in response to a signal from the bumper sensor 160 is also permissible.

In an exemplary operation, the tactile sensor can be constructed and placed on an autonomous robot as a bumper, in accordance with that shown in FIGS. 1–5 (to which reference is again made) and as described above. The profile member 102 can be a unitary member of FORPRENE®, with a Shore hardness of approximately 55. The protrusion 104 is at an angle of approximately 30 degrees with respect to the horizontal H, with distance D being approximately 40 mm, and distance d being approximately 3 mm.

Upon impact with an object, the main segment 103 collapses, with the coil 108 on the rib 106 contacting the strip 110 in a sliding manner. The tactile sensor 20 is now in the active state, at an early point of the contact and shock absorption period, due to this short distance d. The electrical contact goes through the respective electrical leads 115, 116, closing the switch 116, this closure signaling the bumper sensor 160 of the main control unit 150. The main control unit 150 is configured so as shut off the drive system circuitry 154, by cutting off the power from the power supply 41. The impact, having been absorbed by the profile member 102 since the initiation of the impact, continues to be absorbed by the collapse of this main segment 103, whereby the robot 21 stops (ceases motion) within a distance (stopping distance) of approximately the distance D, and preferably a distance D or less, here, within 40 mm or less, thus, minimizing any potential damage or injury.

Once the contact between object and bumper Is released, the profile member 102 returns to its original configuration and shape. In this position, the tactile sensor 20 has returned to its inactive state. As stated above, the robot 21 may have been shut OFF, whereby It must be turned ON again by the user, either manually or remotely.

Figure 6:
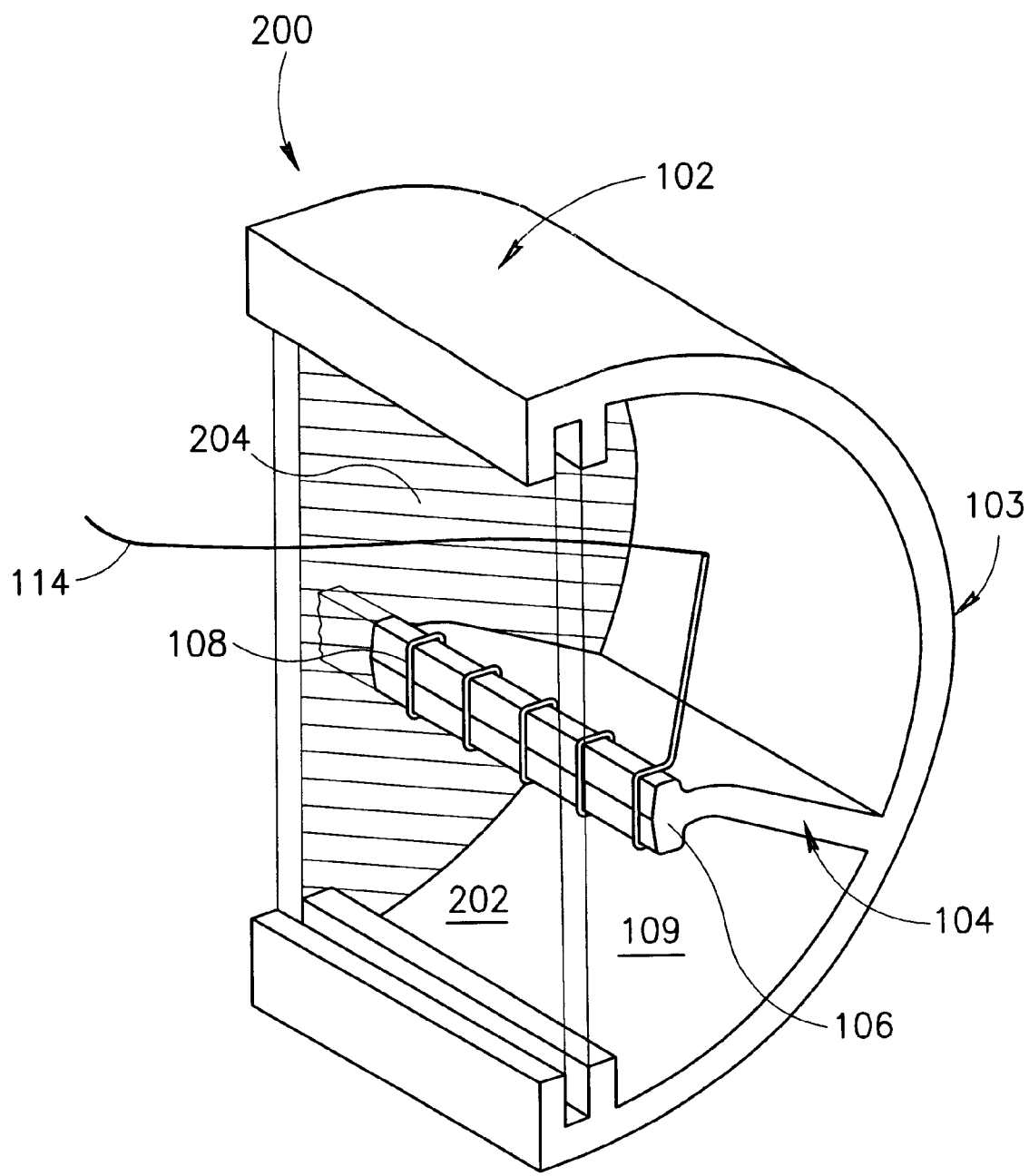
FIG. 6 is a cross section of a second embodiment of the present invention.

FIG. 6 details a second embodiment of a tactile sensor 200 of the present invention. This the tactile sensor 200 is in accordance with the tactile sensor 20 detailed above, except where indicated.

This tactile sensor 200 includes a backing member 202 that supports the strip 110. This backing member 202 may be of the same material as the profile member 102, and joined thereto by conventional fastening techniques. This backing member 202 need only be a of non-conducting material, like the profile member.

This second embodiment also includes end members 204, corresponding in shape to the cross-section of the tactile sensor 200. These end members 204 can be integral with the profile member 102 or the backing member 202, and foldable so as to attach thereover, by a frictional engagement, adhesives or other mechanical fasteners, and cap the ends of the profile member 102, to maintain the integrity of the air space 109 as detailed above, Alternately, the end members 204 may be separate pieces, and may attach at the lateral ends of the tactile sensor 200, so as to provide the requisite spacing needed to keep the coil 108 and strip 110 from making unwanted electrical contacts based on proximity alone and not from contacting an object or the like, and cap the lateral ends of the tactile sensor and maintain the integrity of the air space 109, free of moisture, debris, etc.

As a result of this structure, the tactile sensor 200 is in a strip that can be mounted to the body of a vehicle, or the like. It can be used for example, as a bumper, as detailed above. Typically, with the robot 21 detailed above, the tactile sensor 200 is mounted such that its backing member 202 is attached to the body 22 with adhesives or other suitable mechanical fasteners.

The tactile sensors 20, 200, as detailed above may have other applications. For example, they may be used in devices that control and/or stop movement of automatic doors, such as garage doors, or automatic gates or sun shades, etc. They may also be used to detect proper closures, such as doors, windows of homes, buildings, cabinets, etc.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A tactile sensor comprising:
   a profile member configured to be self supporting and collapsible upon impact comprising:
   a main portion;
   a protrusion having a first end and a second end, said first end in communication with said main portion; and
   an electrically conductive portion at said second end of said protrusion, said electrically conductive portion adapted for electrical contact with an electrically conductive member when said profile member has collapsed.

2. The tactile sensor of claim 1, additionally comprising an electrically conductive member.

3. The tactile sensor of claim 2, additionally comprising a support member, for supporting said electrically conductive member, said support member adapted for attachment to said profile member.

4. The tactile sensor of claim 1, wherein at least said main portion is of an elastically deformable material.

5. The tactile sensor of claim 1, wherein said profile member is of an elastically deformable material.

6. The tactile sensor of claim 1, wherein said protrusion extends from said main portion at an angle of between 0 and 90 degrees with respect to a horizontal.

7. The tactile sensor of claim 6, wherein said angle is approximately 30 degrees.

8. The tactile sensor of claim 1, wherein said electrically conductive portion at said second end of said protrusion comprises a coil.

9. The tactile sensor of claim 2, wherein said electrically conductive member is a strip.

10. The tactile sensor of claim 2, additionally comprising a switch, said switch including a plurality of electrical leads extending therefrom, said electrical leads in communication with said electrically conductive portion and said electrically conductive member, respectively.

11. The tactile sensor of claim 1, wherein said main portion is rounded.

12. The tactile sensor of claim 2, wherein said electrically conductive portion is configured on said profile member to be in alignment with said electrically conductive member.

* * * * *